US008705499B2

(12) United States Patent
Shin et al.

(10) Patent No.: US 8,705,499 B2
(45) Date of Patent: Apr. 22, 2014

(54) MOBILE WIRELESS ACCESS ROUTER FOR SEPARATELY CONTROLLING TRAFFIC SIGNAL AND CONTROL SIGNAL

(75) Inventors: Dong-jin Shin, Daejeon (KR); Young-Jick Bahg, Daejeon (KR); Yeong-Jin Kim, Daejeon (KR)

(73) Assignees: Electronics and Telecommunications Research Institute, Daejeon (KR); SK Telecom Co., Ltd., Seoul (KR); KT Corporation, Seongnam (KR)

( * ) Notice: Subject to any disclaimer, the term of this patent is extended or adjusted under 35 U.S.C. 154(b) by 1279 days.

(21) Appl. No.: 12/086,120

(22) PCT Filed: Dec. 5, 2006

(86) PCT No.: PCT/KR2006/005194
§ 371 (c)(1),
(2), (4) Date: Jun. 5, 2008

(87) PCT Pub. No.: WO2007/066947
PCT Pub. Date: Jun. 14, 2007

(65) Prior Publication Data
US 2009/0161640 A1    Jun. 25, 2009

(30) Foreign Application Priority Data

Dec. 8, 2005  (KR) .................. 10-2005-0119987
May 4, 2006  (KR) .................. 10-2006-0040361

(51) Int. Cl.
*H04W 4/00* (2009.01)
*H04W 36/00* (2009.01)
*G06F 15/173* (2006.01)

(52) U.S. Cl.
USPC ...................... 370/338; 455/436; 709/238

(58) Field of Classification Search
USPC ............................................. 370/338
See application file for complete search history.

(56) References Cited

U.S. PATENT DOCUMENTS 6,473,411 B1 * 10/2002 Kumaki et al. .............. 370/331
7,099,283 B2 * 8/2006 Matta et al. .................. 370/252
(Continued)

FOREIGN PATENT DOCUMENTS

| EP | 1 294 138 A2 | 3/2003 |
| WO | 02/39304 A1 | 5/2002 |
| WO | 03/096555 A2 | 11/2003 |

OTHER PUBLICATIONS

Gao et al; HON: A novel Network Architecture of Support QoS Differentation in Vertical Handovers; DoCoMo Communications Laboratories, USA, 2003, pp. 2799-2803.

(Continued)

*Primary Examiner* — Guang Li
(74) *Attorney, Agent, or Firm* — NSIP Law

(57) ABSTRACT

A wireless access router for separately controlling a traffic signal and a control signal is provided. In a mobile communication access network structure, in order to optimally support a mobile communication terminal, a control signal and a traffic signal of a base station are divided, and a router is controlled by mobile communication system functions such as a mobility management function, a QoS management function, a session control of the terminal, a mobility control, and a QoS control function that are effectively processed. With a wireless access router having the divided control signal and traffic signal, it is expected the traffic concentration and a packet transmission delay can be prevented.

11 Claims, 4 Drawing Sheets

(56) References Cited

U.S. PATENT DOCUMENTS

| | | | |
|---|---|---|---|
| 7,301,911 B2* | 11/2007 | Mack-Crane et al. | 370/254 |
| 7,395,065 B2* | 7/2008 | Dorenbosch | 455/436 |
| 7,403,778 B2* | 7/2008 | Reynolds | 455/436 |
| 7,469,142 B2* | 12/2008 | Nelakanti et al. | 455/436 |
| 7,529,257 B1* | 5/2009 | Tappan | 370/409 |
| 7,593,728 B2* | 9/2009 | Lee et al. | 455/435.1 |
| 7,751,818 B2* | 7/2010 | Chaskar et al. | 455/436 |
| 7,835,742 B2* | 11/2010 | Jaakkola et al. | 455/436 |
| 2002/0133491 A1* | 9/2002 | Sim et al. | 707/10 |
| 2003/0023701 A1 | 1/2003 | Norman et al. | |
| 2003/0227907 A1* | 12/2003 | Choi et al. | 370/352 |
| 2004/0146007 A1 | 7/2004 | Saadawi et al. | |
| 2006/0019664 A1* | 1/2006 | Nelakanti et al. | 455/436 |
| 2006/0256751 A1* | 11/2006 | Jagadeesan et al. | 370/331 |
| 2007/0037556 A1* | 2/2007 | Andrews et al. | 455/412.1 |
| 2007/0091900 A1* | 4/2007 | Asthana et al. | 370/395.42 |

OTHER PUBLICATIONS

X. Gao et al., "HON: A Novel Network Architecture of Support QoS Differentation in Vertical Handovers," *The 14th IEEE 2003 International Symposium on Personal, Indoor and Mobile Radio Communications Proceedings (PIMRC2003)*, vol. 3, pp. 2799-2803, Sep. 7-10, 2003, Beijing, China.

International Search Report and Written Opinion of the International Searching Authority issued on Apr. 3, 2008, in counterpart International Application No. PCT/KR2006/005194 (9 pages).

\* cited by examiner

MOBILE WIRELESS ACCESS ROUTER FOR SEPARATELY CONTROLLING TRAFFIC SIGNAL AND CONTROL SIGNAL

This application is a U.S. national stage application of International Application No. PCT/KR2006/005194 filed on Dec. 5, 2006, which claims the benefit of Korean Application Nos. 10-2005-0119987 filed on Dec. 8, 2005, and 10-2006-0040361 filed on May 5, 2006.

TECHNICAL FIELD

The present invention relates to a wireless access router for performing a routing function. More particularly, the present invention relates to a wireless access router for controlling a traffic signal and a control signal while dividing the same.

BACKGROUND ART

Recently, the Institute of Electrical and Electronics Engineers (IEEE) and the Internet Engineering Task Force (IETF) and the like have researched Internet protocol (IP)-based mobile communication access network configuration technology such the 3rd Generation Partnership Project (3GPP) and the 3rd Generation Partnership Project 2 (3GPP2). 3GPP the most actively standardizes the mobile communication system technology after the 3rd generation one. 3GPP involves a standardized Internet protocol-based service configuration and concerns technologies focusing on three network factors, that is, a core network, an access network, and a terminal, in order to provide an Internet protocol-based mobile communication service.

An Internet protocol-based mobile communication system configuration includes two approaches. A first approach uses conventional Internet equipment and realizes desired functions by connecting a server to the Internet network.

A second approach develops new network equipment for performing the desired functions as necessary, and configures a new mobile communication system.

The first method configures an Internet protocol network by utilizing the conventional well-known Internet protocol (IP)-based equipment, that is, a router, a switch, and the like as is, and joins necessary application technology obtained through the server to the conventional IP-based equipment. Accordingly, it is easily developed and compatible with other systems because it utilizes conventional standardized equipment as they are.

However, the first method has a drawback in that it is difficult to have optimum realized functions and it has unnecessary redundancies.

The second method may optimize functions so as to satisfy system requirements and may realize a high-performance system. However, it requires a lot of time and cost to develop an optimized system and it is difficult to make it compatible with other equipment.

Meanwhile, in an access network, main functions include a wireless terminal access function and a mobility control function. Such functions must be processed at a high speed, and they are sensitive to delay and must be able to provide a seamless service. Accordingly, in a mobile communication access network function application, the first method does not satisfy system requirements such as basic delay and seamless handover.

In addition, the first method is not appropriate for transmitting various control messages for controlling wireless access, and has a problem in that a control signal and a traffic signal are concentrated at a predetermined point of an access router.

In an Internet protocol-based mobile communication access network, the access router forms a combination with a core network and mobility control of subnets and the like.

In order to perform such functions, the access router transmits a control message using a router advertisement (RA) message.

However, the RA message is transmitted along with the traffic signal passing through the router, and accordingly there is a problem of a control message transmission delay when the traffic signals are concentrated.

Such an access router has a problem in that it has a two-way structure separated from the mobile communication access network's unique functions, that is, radio resource and terminal information management and the like.

The above information disclosed in this Background Art section is only for enhancement of understanding of the background of the invention and therefore it may contain information that does not constitute prior art that is already known in this country to a person of ordinary skill in the art.

DISCLOSURE

Technical Problem

The present invention has been made in an effort to provide a wireless access router having advantages of controlling a traffic signal and a control signal while dividing the same.

Technical Solution

An exemplary embodiment of the present invention provides a wireless access router for performing a routing function, including an access manager for controlling a routing function by performing a mobile communication system function among some functions of the base station according to a control signal received from an external base station; and a router for processing a traffic signal of the base station received though a path separated from that of the control signal and performing a routing function of the Internet protocol packet received by the control of the access manager.

MODE FOR INVENTION

Figure 1:
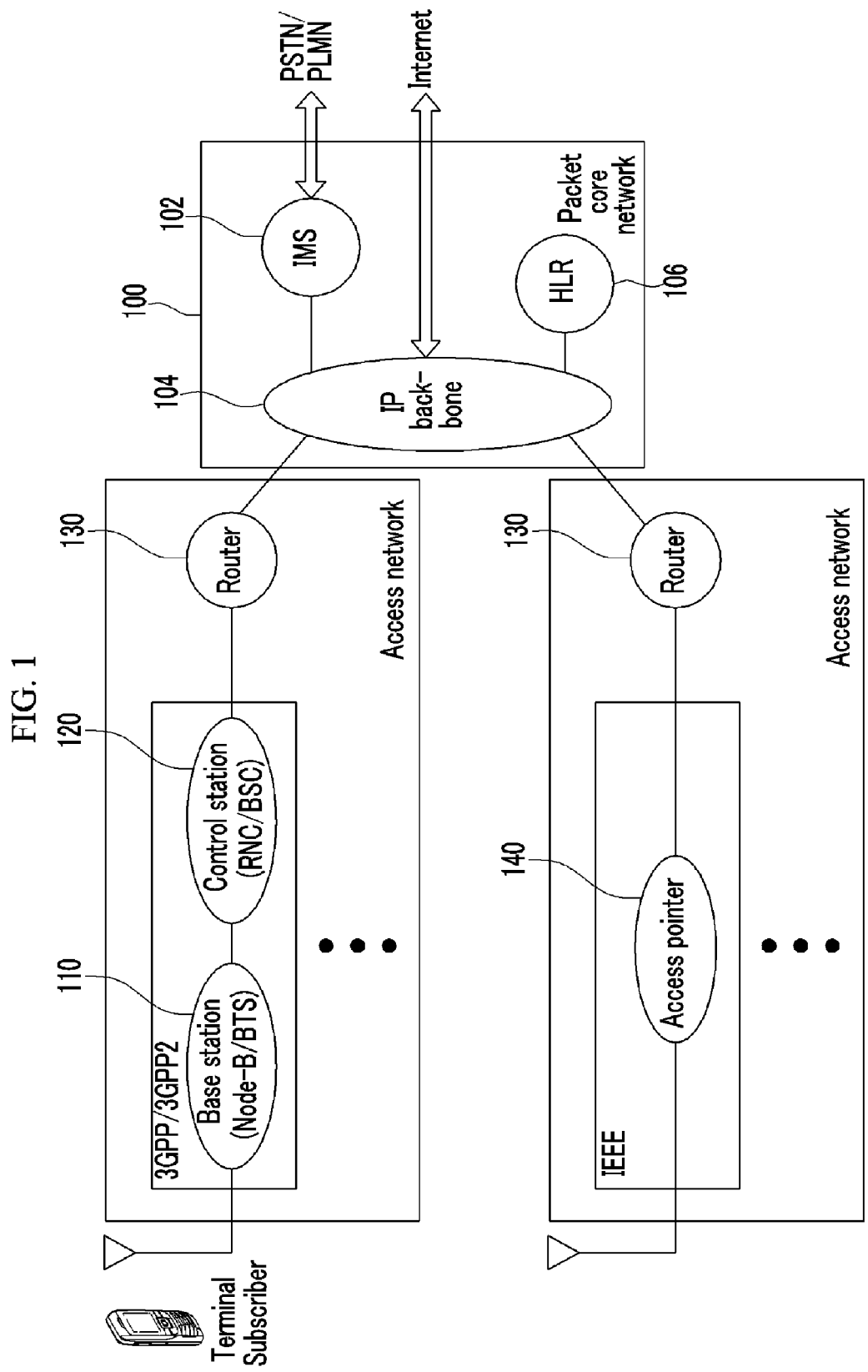
FIG. 1 is a block diagram schematically showing a conventional Internet protocol-based mobile communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

In addition, in the specification, a term "module" means one unit for performing a specified function or operation, and may be realized by means of hardware, software, or a combination of hardware and software.

FIG. 1 is a block diagram schematically showing a conventional Internet protocol-based mobile communication system.

The Internet protocol-based mobile communication system is configured by organically interworking access networks and a packet core network 100.

The packet core network 100 includes an Internet protocol multimedia subsystem (IMS) 102, an IP backbone 104, and the like.

The Internet protocol multimedia subsystem (IMS) 102 is a third switching system next to a circuit switch and soft switch, and functions to integrate voice and data into one structure and transmit the integrated voice and data to equipment connected to the Internet protocol network.

The IP backbone 104 is a base interface of the Internet protocol for connecting the packet core network 100 to an access network if it is a short distance, or to a local access network line for a long distance access.

A home location register (HLR) 106 receives location information of a terminal and performs registration recognition, registration deletion, location confirmation functions, and the like.

The access network includes a base station 110, a control station 120, and a router 130, or an access pointer 140 and a router 130.

The access pointer 140 is included in a wireless LAN and is for connecting a wired LAN to a wireless LAN. The access pointer 140 incorporates a wired LAN hub function and a wire port such that it may connect a fixed printer or a PC without mobility, and provides access to a portable terminal such as a laptop though a wireless LAN.

The router 130 is for connecting inter-layers of a network with each other though a device for connecting the separated networks using the same transmission protocol, and performs packet switching, packet forwarding, packet filtering, routing, and the like.

The base station 110 transmits telephone request signals from the terminal and performs location information registration for connecting with a mobile communication terminal location that exists in a cell area that the base station 110 covers. The base station 110 may use a Base-station Transmission System (BTS) in a synchronous scheme, and a Node-B in a non-synchronous scheme. The base station 110 can utilize a conventionally standardized interface, and utilizes an improved Internet protocol-based interface.

The control station 120 controls radio channel allocation and disconnection for the terminal, a transmission output control function of the base station 110, inter-cell soft handoff and hard hand-off determination, transcoding, vocoding, GPS (Global Positioning System) clock distribution, and management and maintenance functions of the base station 110.

The control station 120 may be a Base Station Controller (BSC) in a synchronous scheme, and may be a Radio Network Controller (RNC) in a non-synchronous scheme. The control station 120 may utilize a previously standardized packet interface so as to be connected to the packet core network 100 though the IP backbone 104, and may use newly configured equipment.

As shown in FIG. 1, the conventional Internet protocol-based mobile communication system configures a transmission network using conventional wired Internet equipment, that is, equipment such as the router 130 and the switch, and has a separated structure that is divided into a transmission layer and an application layer by providing a mobile communication function to an application layer. Such a structure has a problem with packet data delay and inefficiency in an access network requiring wireless access control and mobility control functions.

Now, a wireless access router 200 that is controlled by dividing a traffic signal and a control signal according to an exemplary embodiment of the present invention is described in detail with reference to FIG. 2.

Figure 2:
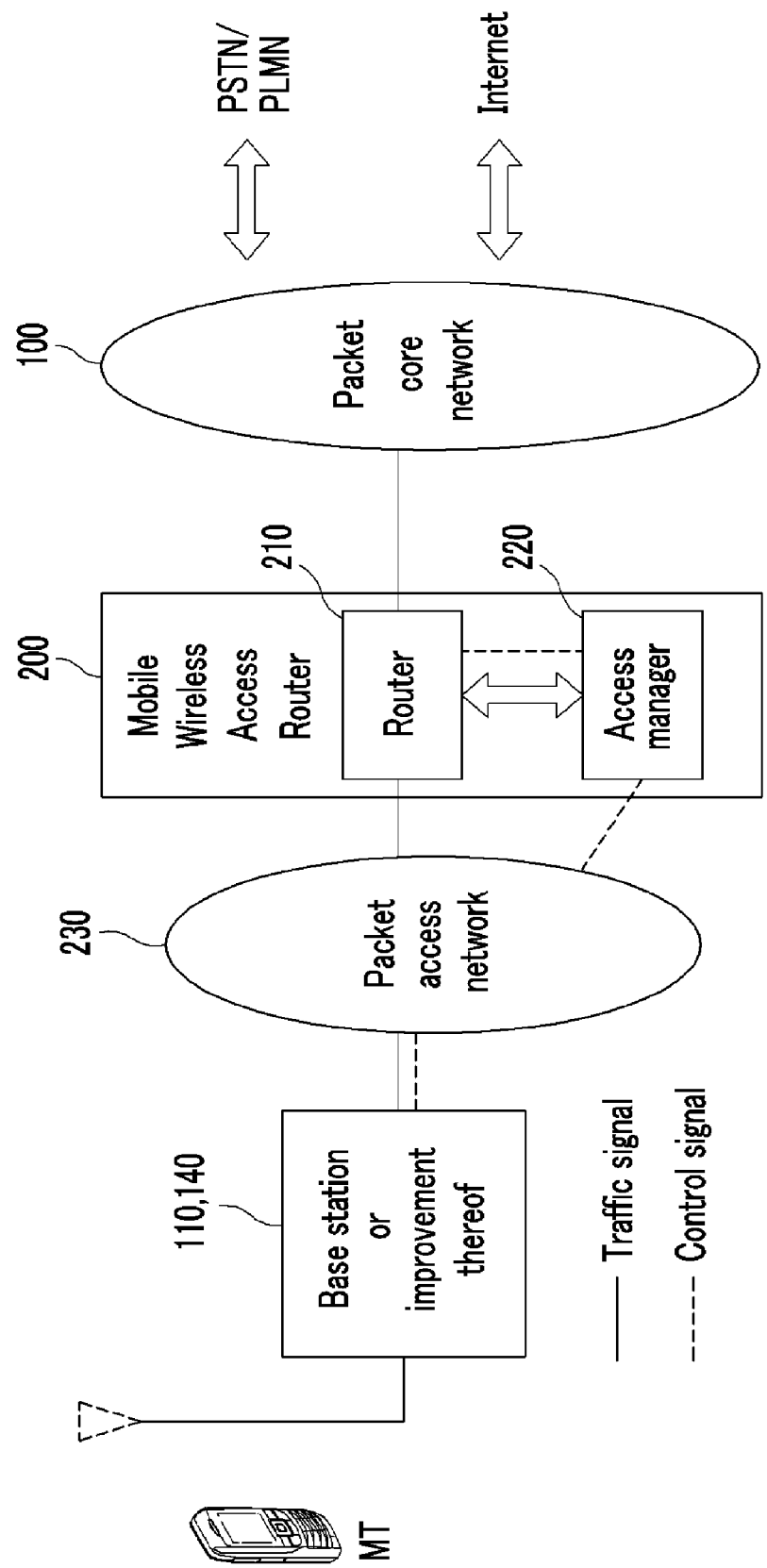
FIG. 2 is a block diagram schematically showing a mobile communication system using a wireless access router according to an exemplary embodiment of the present invention.

FIG. 2 is a block diagram schematically showing a mobile communication system using a wireless access router according to an exemplary embodiment of the present invention.

The mobile communication system using the wireless access router 200 according to an exemplary embodiment of the present invention includes base stations 110 and 140, a packet access network 230, the wireless access router 200, and a packet core network 100.

The packet access network 230 is an Internet protocol network, and it broadcasts packet data by transmitting/receiving the same between the base stations 110 and 140 and the wireless access router 200.

The wireless access router 200 includes a router 210 for performing a router function, and an access manager 220 for controlling an access network.

According to an exemplary embodiment of the present invention, the access manager 220 processes a control signal received from the packet access network 230, and the router 210 processes a traffic signal received from the packet access network 230 through a different path from that of the control signal.

The matching of the router 210 and the access manager 220 is achieved using a standardized interface such as a high-speed Ethernet or bus scheme.

The access manager 220 performs, among some functions of the control station 120 in FIG. 1, the access router related functions, that is, a mobility management function for the handover, a session management function such as a session establishment/disconnection function, a QoS management function, and a radio resource and terminal/subscriber information management function.

The router 210 has packet switching, packet forwarding, packet filtering, and routing functions that a router generally has, and also has a function for controlling functions according to instructions of the access manager 220.

Hereinafter, the function of the access manager 220 in the wireless access router 200 is described in detail with reference to FIG. 3.

Figure 3:
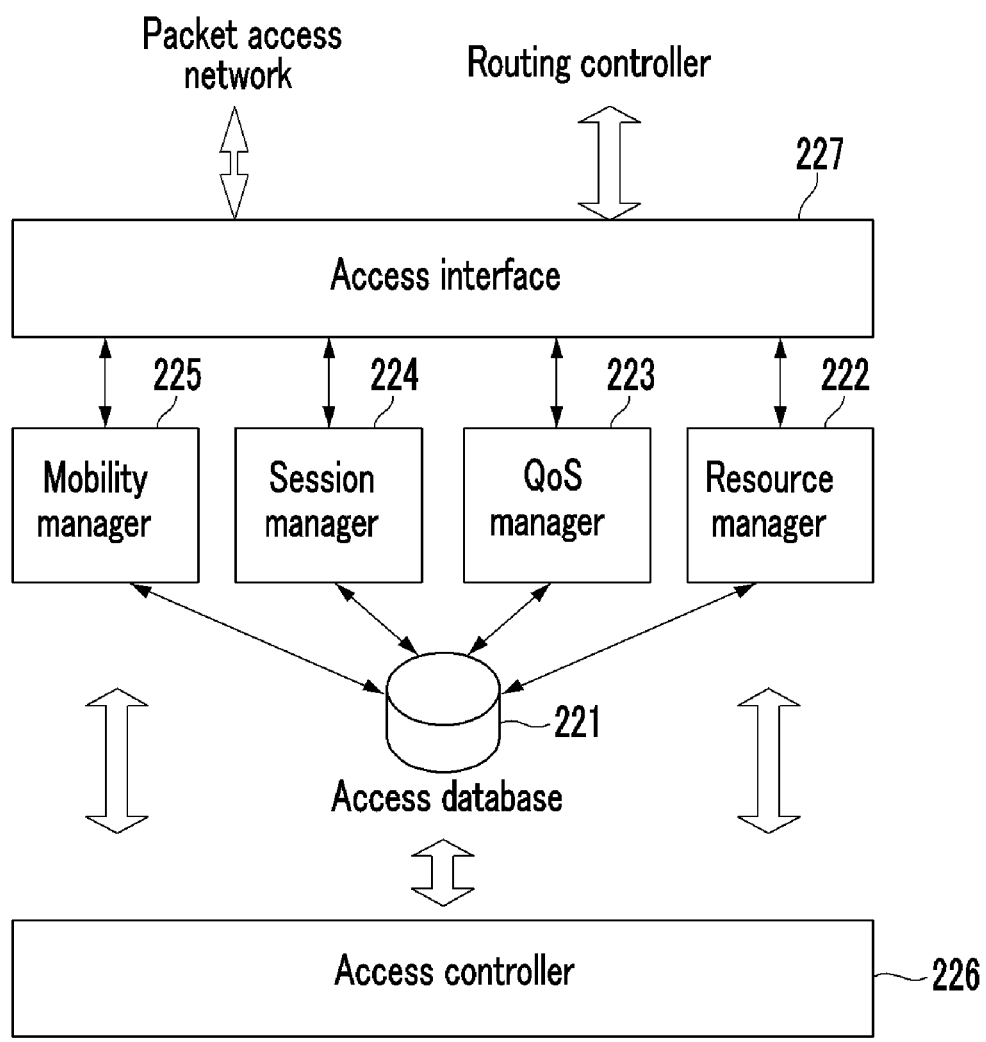
FIG. 3 is a block diagram showing an internal structure of an access manager according to an exemplary embodiment of the present invention.

FIG. 3 is a block diagram showing an internal structure of an access manager according to an exemplary embodiment of the present invention.

The access manager 220 includes an access database 221, a resource manager 222, a QoS manager 223, a session manager 224, a mobility manager 225, an access controller 226, and an access interface 227.

The access database 221 stores radio resource information and subscriber/terminal information.

The resource manager 222 manages resources for establishing links, that is, a radio channel, an IP address, a subscriber number, router port information, a session, and call QoS information so as to establish wireless and wired links necessary for the terminal or subscriber in an access network link.

The mobility manager 225, the session manager 224, and the QoS manager 223 use the information generated from the resource manager 222 so as to control respective functions.

The QoS manager 223 interworks with the packet core network 100 and manages communication QoS, and controls the router 210 of the wireless access router 200 so as to manage communication QoS of a terminal.

The session manager 224 performs a proxy call control function on a terminal voice over IP (VoIP) or MultiMedia over IP (MMoIP) telephone.

The session manager 224 performs call establishment/disconnection functions and a call session handover function by interworking with the mobility manager 225 so as to maintain continuity of the call when the terminal moves while maintaining the call.

The mobility manager 225 maintains information of the corresponding base stations (Node-B, BTS, AP, and the like) 110 and 140 on the handover of the wireless access router 200, and activates and deactivates a multicast function of the router 210 so as to establish a link for handover between the terminal and the wireless access router 200.

The information regarding the base stations 110 and 140 includes base station identifier information, router port information, call identifier information, QoS information, and the like.

The access controller 226 allows the improved base stations (Node-B/BTS/AP) 110 and 140 for replacing the conventional base station 110 to transmit/receive a control signal to/from the terminal, and controls the resource manager 222, the QoS manager 223, the session manager 224, and the mobility manager 225 to perform the wireless link establishment/disconnection, the resource reservation, the QoS reservation, and the session and terminal mobility management functions.

The access controller 226 performs mobility management, terminal and subscriber authentication, session establishment/disconnection for voice and image communication, and QoS control functions by means of interworking with the control signal of the Internet protocol multimedia subsystem (IMS) 102 in FIG. 1 of the packet core network 100 and other network elements.

The access controller 226 transmits/receives routing control signals to/from the routing controller of the router and controls a router function and forwarding function.

The access controller 226 analyzes the control signals received from the base stations 110 and 140 and controls the router. Accordingly, it controls a routing function of the Internet protocol packets.

The access interface 227 provides a connection function for matching the packet access network 230 and the routing controller. The access interface 227 receives a control signal of the base stations 110 and 140 from the packet access network 230 and transmits the same to the access controller 226, and receives the control signal from the access controller 226 and transmits the same to the routing controller.

The wireless access router 200 has a general IP-based transmission path connected to the packet access network 230 and the packet core network 100. The packet access network 230 includes two paths, that is, a traffic path passing though the routing processor and a control signal path connected to the access controller 226.

The general IP-based transmission path of the wireless access router 200 is connected to an edge router of the packet core network 100 and matches other network factors of the packet core network 100.

Now, the function of the router 210 of the wireless access router 200 is described in detail with reference to FIG. 4.

Figure 4:
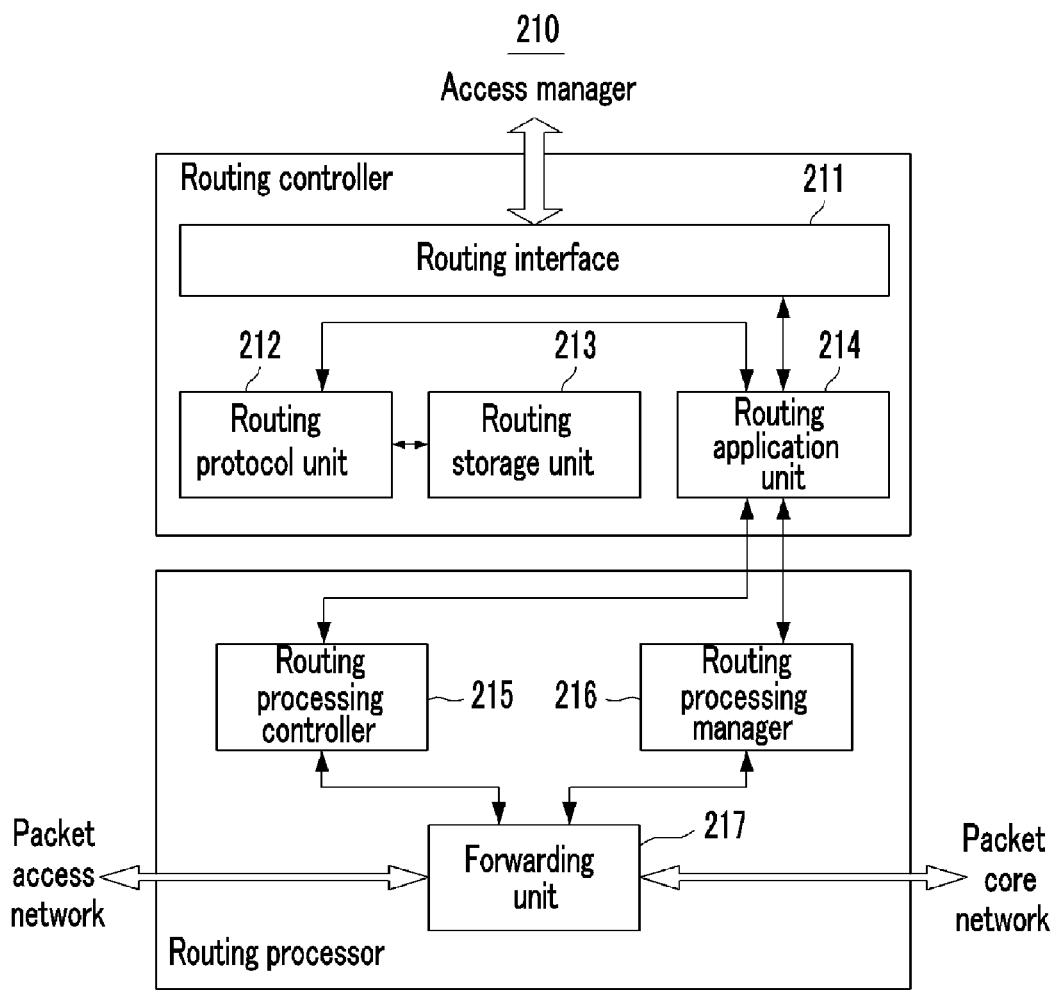
FIG. 4 is a block diagram showing an internal structure of a router according to an exemplary embodiment of the present invention.

FIG. 4 is a block diagram showing an internal structure of a router according to an exemplary embodiment of the present invention.

According to an exemplary embodiment of the present invention, the router 210 has a matching function with the access manager 220, and a router function controlled by the access manager 220.

The router 210 includes a routing controller and a routing processor.

The routing controller includes a routing interface 211, a routing protocol unit 212, a routing storage unit 213, and a routing application unit 214.

The routing interface 211 processes the control signals of the base stations 110 and 140 received from the access manager 220.

The routing interface 211 provides an access means for matching with the access manager 220.

The routing protocol unit 212 processes the routing protocol and performs routing table generation and maintenance, and system operation maintenance functions. The routing protocol unit 212 finds a destination address of the Internet protocol header, compares the found destination address with each entry of the generated routing table, and performs a routing entry synchronization function.

The routing protocol unit 212 includes a Routing Information Protocol (RIP) module, an Open Shortest Path First (OSPF) module, an Intermediate System to Intermediate System (IS-IS) module, and a Border Gateway Protocol (BGP) module. The routing protocol unit 212 may include modules for performing other protocols as well as the above-noted protocols.

The routing storage unit 213 receives and stores routing table information indicating a path from the routing protocol unit 212 to the specified destination on the network, and information for finding optimum packet paths.

The routing application unit 214 executes a routing protocol though the routing protocol unit 212 and then selects the optimum paths by comparing all paths obtained using the predetermined protocols of the respective paths. The routing application unit 214 receives the coincident routing entry information from the routing protocol unit 212, and then finds the next hop routing and output interface information.

The routing application unit 214 analyzes the routing control signals received from the access controller 226 of the access manager 220 and controls the routing function of the Internet protocol packets according to radio resources for establishing a link of the terminal.

The routing processor includes a routing processing controller 215, a routing processing manager 216, and a forwarding unit 217.

The routing processing controller 215 controls the system to perform switching, forwarding, filtering, and routing functions of the received Internet protocol packets according to the control signal of the routing application unit 214.

The routing processing manager 216 manages general routing functions such as the internal signal processing, forwarding table generation, and packet recombination of the routing processor according to the control signals of the routing application unit 214.

The forwarding unit 217 processes the traffic signals received from the packet access network 230 by analyzing the packet header information when the Internet protocol packets are input, and opening the packet transmission path to the corresponding output port with reference to the forwarding table.

The forwarding unit 217 performs a series of functions for transmitting packets to the final destination network using the header information of the received Internet protocol packets.

The packet header information has included only 2-layer or 3-layer packet header information. Recently, it has come to include 4-layer packet header information. Accordingly, the forwarding unit 217 performs packet classification for referring to the 4-layer packet header information.

In addition, the packet header information may include 5 or more layers of header information in next generation switching equipment to provide various services such as audio or video streaming communication QoS guarantee, firewall, or web switching.

[Industrial Applicability]

According to an exemplary embodiment of the present invention, the optimized structure of the wireless access router 200 in which the mobile communication function is tightly connected to the Internet function and the control signal is separated from the traffic signal has been provided.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

With the structure described above, traffic concentration and packet transmission delay may be prevented though a wireless access router in which a control signal is separated from a traffic signal.

According to an exemplary embodiment of the present invention, the access manager can efficiently perform mobility management and session management such as a handover and QoS management through the router control thereof.

The invention claimed is:

1. A wireless access router for performing a routing function, the wireless access router comprising:
   an access manager, in the wireless access router, to control a routing function by performing a mobile communication system function of a wireless base station according to a control signal of an external wireless base station received through a first path; and
   a router, in the wireless access router, to process a traffic signal of the external wireless base station received through a second path that is different from the first path, and perform a routing function of Internet protocol packets in the traffic signal under control of the access manager;
   wherein for every external wireless base station, the first path is independent of the second path, and does not pass through the router; and
   for every external wireless base station, the second path is independent of the first path, and does not pass through the access manager, and wherein the access manager comprises:
   an access database to store information on radio resources, terminals, and subscribers;
   a resource manager to manage a resource for establishing a wireless link and a wired link for a terminal in an access network;
   a QoS manager to control the router to manage a communication QoS of the terminal;
   a mobility manager to activate/deactivate a multicast function of the router to establish a link for handover between the terminal and the wireless access router; and
   a session manager to perform a call session handover function by interworking with the mobility manager to maintain call continuity when the terminal moves.

2. The wireless access router of claim 1, wherein the access manager further comprises an access controller to perform wireless link establishment/disconnection, or radio resource reservation, or QoS reservation, or session and terminal mobility management functions, or any combination thereof, by transmitting/receiving the control signal to/from the external wireless base station and terminal, and controlling the resource manager, the QoS manager, the session manager, and the mobility manager.

3. The wireless access router of claim 1, wherein the mobile communication system function comprises a handover mobility management function, or a session establishment/disconnection function, or a QoS management function, or a radio resource and terminal/subscriber information management function, or any combination thereof.

4. The wireless access router of claim 1, wherein the mobility manager maintains information on the external wireless base station in a case of a handover of the external wireless base station in the wireless access router.

5. The wireless access router of claim 4, wherein the information on the external wireless base station comprises wireless base station identifier information, or router port information, or a call identifier, or QoS information, or any combination thereof.

6. The wireless access router of claim 1, wherein the access manager transmits/receives a control signal to/from external network elements and performs mobility management function, a terminal and subscriber authentication function, a session establishment/disconnection function for voice and image communication, and a QoS control function.

7. The wireless access router of claim 1, wherein a resource for the link establishment by the resource manager comprises a radio channel, or an Internet protocol address, or a subscriber number, or router port information, or a session, or call QoS information, or any combination thereof.

8. The wireless access router of claim 1, wherein the router comprises:
   a routing controller to process a routing protocol under control of the access manager; and
   a routing processor to perform a routing function and a forwarding function.

9. The wireless access router of claim 8, wherein the routing controller comprises:
   a routing interface to receive a control signal from the access manager and process the control signal;
   a routing protocol unit to process the routing protocol and generate and manage a routing table;
   a routing storage unit to store routing table information and information for finding an optimum path of a packet; and
   a routing application unit to analyze the routing control signal received from the access manager and control the routing function of the Internet protocol packets according to a radio resource for establishing a terminal link.

10. The wireless access router of claim 8, wherein the routing processor comprises:

a routing processing controller to process a switching function, or a forwarding function, or a filtering function, or a routing function, or any combination thereof, of the Internet protocol packets according to a control signal of the routing controller;
a routing processing manager to manage an internal signal processing function of the routing processor, or a forwarding table generation function of the routing processor, or a packet recombination function of the routing processor, or any combination thereof; and
a forwarding unit to transmit the Internet protocol packets by opening a packet transmission path to a corresponding output port with reference to the forwarding table.

11. The wireless access router of claim 1, wherein the wireless access router is an integrated unit which houses the access manager and the router.

* * * * *